US008280721B2

(12) United States Patent
Snow et al.

(10) Patent No.: US 8,280,721 B2
(45) Date of Patent: Oct. 2, 2012

(54) EFFICIENTLY REPRESENTING WORD SENSE PROBABILITIES

(75) Inventors: Rion Snow, San Francisco, CA (US); Giovanni Lorenzo Thione, San Francisco, CA (US); Scott A. Waterman, Campbell, CA (US); Chad Walters, San Francisco, CA (US); Timothy Converse, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 773 days.

(21) Appl. No.: 12/200,999

(22) Filed: Aug. 29, 2008

(65) Prior Publication Data

US 2009/0094019 A1 Apr. 9, 2009

Related U.S. Application Data

(60) Provisional application No. 60/969,447, filed on Aug. 31, 2007, provisional application No. 60/969,486, filed on Aug. 31, 2007.

(51) Int. Cl.
*G06F 17/27* (2006.01)

(52) U.S. Cl. .................... 704/9; 704/1; 704/270; 704/8; 704/10

(58) Field of Classification Search .................. 704/1, 7, 704/9, 10, 270
See application file for complete search history.

(56) References Cited

U.S. PATENT DOCUMENTS 4,876,643 A 10/1989 McNeill et al.
5,434,931 A * 7/1995 Quardt et al. ................. 382/271
5,519,608 A 5/1996 Kupiec
5,530,939 A 6/1996 Mansfield, Jr et al.
5,541,836 A * 7/1996 Church et al. .................... 704/7
5,696,962 A 12/1997 Kupiec
5,933,822 A 8/1999 Braden-Harder et al.
6,076,051 A 6/2000 Messerly
6,161,084 A 12/2000 Messerly
6,185,592 B1 2/2001 Boguraev et al.
6,189,002 B1 2/2001 Roitblat (Continued)

FOREIGN PATENT DOCUMENTS

EP 0597630 5/1994

(Continued)

OTHER PUBLICATIONS

D. Yarowsky, "Word-Sense Disambiguation Using Critical Statistical Models of Reoget's Categories Trained on Large Corpora," in Proc. COLING92, Nantes, France (1992).*

(Continued)

*Primary Examiner* — Pierre-Louis Desir
*Assistant Examiner* — Fariba Sirjani
(74) *Attorney, Agent, or Firm* — Hope Baldauff Hartman, LLC

(57) ABSTRACT

Word sense probabilities are compressed for storage in a semantic index. Each word sense for a word is mapped to one of a number of "buckets" by assigning a bucket score to the word sense. A scoring function is utilized to assign the bucket scores that maximizes the entropy of the assigned bucket scores. Once the bucket scores have been assigned to the word senses, the bucket scores are stored in the semantic index. The bucket scores stored in the semantic index may be utilized to prune one or more of the word senses prior to construction of the semantic index. The bucket scores may also be utilized to prune and rank the word senses at the time a query is performed using the semantic index.

10 Claims, 8 Drawing Sheets

U.S. PATENT DOCUMENTS 6,243,670 B1 6/2001 Bessho et al.
6,246,977 B1 6/2001 Messerly et al.
6,269,368 B1 7/2001 Diamond
6,366,908 B1 4/2002 Chong et al.
6,374,209 B1 4/2002 Yoshimi et al.
6,553,366 B1 * 4/2003 Miller et al. .......................... 1/1
6,654,740 B2 11/2003 Tokuda et al.
6,675,159 B1 1/2004 Lin et al.
6,678,677 B2 1/2004 Roux et al.
6,741,981 B2 5/2004 McGreevy
6,766,316 B2 7/2004 Claudill et al.
6,766,320 B1 7/2004 Wang et al.
6,795,820 B2 9/2004 Barnett
6,823,301 B1 11/2004 Ishikura
6,842,730 B1 1/2005 Ejerhed et al.
6,871,174 B1 * 3/2005 Dolan et al. ...................... 704/9
6,871,199 B1 3/2005 Binnig et al.
6,901,399 B1 5/2005 Corston
6,947,923 B2 9/2005 Cha et al.
6,952,495 B1 * 10/2005 Lee et al. ...................... 382/168
6,968,332 B1 11/2005 Milic-Frayling
7,016,828 B1 3/2006 Coyne et al.
7,027,974 B1 4/2006 Busch et al.
7,031,910 B2 4/2006 Eisele
7,035,789 B2 4/2006 Abrego et al.
7,120,574 B2 10/2006 Troyanova et al.
7,171,349 B1 1/2007 Wakefield et al.
7,184,950 B2 2/2007 Weise
7,194,406 B2 3/2007 Ejerhed et al.
7,225,121 B2 5/2007 Maxwell et al.
7,269,594 B2 9/2007 Corston-Oliver
7,319,951 B2 1/2008 Rising et al.
7,346,490 B2 3/2008 Fass
7,389,224 B1 6/2008 Elworthy
7,398,201 B2 7/2008 Marchisio
7,401,077 B2 7/2008 Bobrow et al.
7,403,938 B2 7/2008 Harrison et al.
7,509,313 B2 * 3/2009 Colledge et al. ...................... 1/1
7,739,276 B2 * 6/2010 Lee et al. ...................... 707/723
7,813,916 B2 * 10/2010 Bean ................................ 704/9
7,895,221 B2 * 2/2011 Colledge et al. .............. 707/758
7,925,610 B2 * 4/2011 Elbaz et al. ..................... 706/55
2001/0000356 A1 * 4/2001 Woods .............................. 707/3
2002/0026456 A1 * 2/2002 Bradford ...................... 707/500
2002/0091684 A1 7/2002 Nomiyama et al.
2003/0233224 A1 12/2003 Marchisio et al.
2004/0103090 A1 5/2004 Dogl et al.
2004/0215428 A1 * 10/2004 Bras et al. ......................... 703/2
2004/0243554 A1 12/2004 Broder et al.
2004/0243556 A1 12/2004 Ferrucci et al.
2004/0249795 A1 12/2004 Brockway
2005/0043936 A1 2/2005 Corston-Oliver et al.
2005/0065777 A1 * 3/2005 Dolan et al. .................... 704/10
2005/0071150 A1 3/2005 Nasypny
2005/0108001 A1 5/2005 Aarskog
2005/0108630 A1 5/2005 Wasson et al.
2005/0149230 A1 * 7/2005 Gupta et al. .................. 700/246
2005/0182619 A1 8/2005 Azara
2005/0267871 A1 12/2005 Marchisio et al.
2006/0047632 A1 3/2006 Zhang
2006/0156222 A1 7/2006 Chi
2006/0161534 A1 7/2006 Carson, Jr. et al.
2006/0184517 A1 8/2006 Anderson
2006/0224582 A1 10/2006 Hogue
2006/0271353 A1 11/2006 Berkan et al.
2006/0277168 A1 * 12/2006 Hammond et al. ............... 707/3
2007/0073533 A1 3/2007 Thione et al.
2007/0073745 A1 3/2007 Scott
2007/0143098 A1 6/2007 Van der Berg
2007/0156393 A1 7/2007 Todhunter et al.
2008/0033982 A1 2/2008 Parikh
2008/0086498 A1 4/2008 Sureka
2008/0120279 A1 5/2008 Xue
2008/0162117 A1 * 7/2008 Bangalore et al. .............. 704/10
2008/0172628 A1 7/2008 Mehrotra
2008/0229332 A1 * 9/2008 Lloyd et al. ................... 719/318
2009/0271179 A1 10/2009 Marchisio et al.
2010/0106706 A1 4/2010 Rorex
2011/0178794 A1 * 7/2011 Michelin ........................... 704/9
2011/0179032 A1 * 7/2011 Ceusters et al. .............. 707/737
2011/0202563 A1 * 8/2011 Colledge et al. .............. 707/780

FOREIGN PATENT DOCUMENTS

KR 10-0546743 4/2005
WO WO 02/067145 8/2002

OTHER PUBLICATIONS

Carmel et al., "Static index pruning for information retrieval systems," in SIGIR '01:Proceedings of the 24th annual international ACM SIGIR conference on research and development in information retrieval, pp. 43-50, New York, NY, USA, 2001. ACM.*

International Search Report dated Apr. 29, 2009 in International Application No. PCT. No. PCT/US08/074981.

U.S. Official Action dated Jan. 3, 2011 in U.S. Appl. No. 12/201,596.

Jun et al., "Keyfact-Based Information Retrieval System", TaeJon, Korea, downloaded Mar. 18, 2011 from http://www.dl.slis.tsukuba.ac.jp/ISDL97/proceedings/miseon/miseon.html, 6 pages.

Tablan et al., "A Natural Language Query Interface to Structured Information", downloaded Mar. 18, 2011 from http://www.eswc2008.org/final-pdfs-for-web-site/onl-2.pdf, 15 pages.

International Search Report dated Mar. 26, 2009 in International Application No. PCT/US2008/074935.

Bontcheva et al., "Shallow Methods for Named Entity Coreference Resolution," Proceedings of the TALN 2002 Workshop. Nancy, France. Jun. 24-27, 2002, 9 pages.

Ng, Vincent "Shallow Semantics for Coreference Resolution," Proceedings of the Twentieth International Joint Conference on Artificial Intelligence (IJCAI), Hyderabad, India, Jan. 2007, pp. 1689-1694.

Duchier, Denys,"Constraint Programming for Natural Language Processing", retrieved at <<http://citeseerx.ist.psu.edu/viewdoc/download;jsessionid=F70461C9F31A4EB405543CE688CCBF3D?doi=10.1.1.10.3152&rep=rep1&type=pdf>>, 2000. pp. 1-94.

"Powerset, Natural Language Search Engine", retrieved at <<http://googlesystem.blogspot.com/2007/02/powerset-natural-language-search-engine.html>>, Feb. 9, 2007. pp. 1-3.

Chien, Lee-Feng,"Fast and Quasi-Natural Language Search for Gigabytes of Chinese Texts", retrieved at <<http://delivery.acm.org/10.1145/220000/215345/p112-chien.pdf?key1=215345&key2=4667021221&coll=GUIDE&dl=GUIDE&CFID=2506110&CFTOKEN=93982745>>, 1995. pp. 1-9.

Kolodner Janet L.,"Indexing and Retrieval Strategies for Natural Language Fact Retrieval", retrieved z", retrieved at <<http://delivery.acm.org/10.1145/320000/319995/p434-kolodner.pdf?key1=319995&key2=1457021221&coll=GUIDE&dl=GUIDE&CFID=2551390&CFTOKEN=71366194>>, ACM Transactions on Database Systems, vol. 8, No. 3, Sep. 1983. pp. 1-31.

Thione, et al., "Applying Term Occurrence constraints in natural language search", U.S. Appl. No. 60/969,406, filed Aug. 31, 2007.

Walters, et al., "Flexible Ranking infrastructure for query execution", U.S. Appl. No. 60/969,410, filed Aug. 31, 2007.

Walters, et al., "Checkpointing of composable lazily-evaluated integrators in search", U.S. Appl. No. 60/969,417, filed Aug. 31, 2007.

Thione, et al., "Indexing of alias clusters for search", U.S. Appl. No. 60/969,426, filed Aug. 31, 2007.

Crouch, et al., "Aboutness identification and indexing", U.S. Appl. No. 60/969,434, filed Aug. 31, 2007.

Polanyi, et al., "Valence calculus for indexing with special reference to reported speech and thought", U.S. Appl. No. 60/969,442, filed Aug. 31, 2007.

Snow, et al., "Bucketized threshold for runtime pruning of senses/ranking", U.S. Appl. No. 60/969,447, filed Aug. 31, 2007.

Pell, et al., "Hierarchal probability-based weighting for hypernyms in word sense disambiguation", U.S. Appl. No. 60/969,451, filed Aug. 31, 2007.

Biewald, et al., "Priority-based ranking functions for information retrieval", U.S. Appl. No. 60/969,453, filed Aug. 31, 2007.

Pell, et al.,"Priority-based disjunctive retrieval", U.S. Appl. No. 60/969,457, filed Aug. 31, 2007.

Rayner, et al., "Semi-automatic example-based induction of semantic translation rules to support natural language search", U.S. Appl. No. 60/969,472, filed Aug. 31, 2007.
Thione, et al., "Semantically-based highlighting of search results", U.S. Appl. No. 60/969,478, filed Aug. 31, 2007.
Salvetti, et al., "Integration of coreference resolution in an ambiguity-sensitive natural language processing pipeline for a search platform", U.S. Appl. No. 60/969,483, filed Aug. 31, 2007.
Thione, et al.,"Fact-based indexing for natural language search", U.S. Appl. No. 60/969,486, filed Aug. 31, 2007.
Thione, et al., "Attribute-value mapping to map structural information about entities to ontologies", U.S. Appl. No. 60/969,488, filed Aug. 31, 2007.
Thione, et al., "Indexing and ranking role hierarchies search index", U.S. Appl. No. 60/969,490, filed Aug. 31, 2007.
Thione, et al., "Efficient posting layout for retrieval of terms in dominance hierarchies", U.S. Appl. No. 60/969,495, filed Aug. 31, 2007.
Salvetti, et al., "A system for browsing knowledge on the basis of semantic relations", U.S. Appl. No. 60/971,061, filed Sep. 10, 2007.
U.S. Official Action dated Jun. 22, 2011 in U.S. Appl. No. 12/201,596.
International Search Report dated Mar. 31, 2009 in International Application No. PCT/US08/074938.
International Search Report dated Jan. 23, 2009 in International Application No. PCT/US08/074978.
International Search Report dated Mar. 31, 2009 in International Application No. PCT/US08/074984.
International Search Report dated Mar. 31, 2009 in International Application No. PCT/US08/074987.
European Search Report dated Oct. 5, 2011 in European Application No. 08799054.5.
U.S. Official Action dated Mar. 17, 2011in U.S. Appl. No. 12/201,504.
U.S. Official Action dated Oct. 12, 2011 in U.S. Appl. No. 12/201,504.
U.S. Official Action dated Jan. 25, 2011 in U.S. Appl. No. 12/201,675.
U.S. Official Action dated Apr. 14, 2011 in U.S. Appl. No. 12/201,675.
U.S. Official Action dated Oct. 3, 2011 in U.S. Appl. No. 12/201,675.
U.S. Official Action dated Mar. 15, 2011 in U.S. Appl. No. 12/201,721.
U.S. Official Action dated Oct. 26, 2011 in U.S. Appl. No. 12/201,721.
U.S. Official Action dated Dec. 23, 2010 in U.S. Appl. No. 12/201,978.
U.S. Official Action dated Jun. 7, 2011 in U.S. Appl. No. 12/201,978.
Agichtein, et al., "Snowball: Extracting Relations from Large Plain-Text Collections," Dec. 1999, Columbia University Computer Science Dept. Technical Report CUCS-033-99, 13 pp.
Alesso, "Semantic Search Methods," downloaded Aug. 28, 2008 from http://microsoft.apress.com/asptodayarchiveI73985/semantic-search-methods, 14 pages.
Araghi, "Users Satisfaction through Better Indexing," 2005, *Cataloging & Classification Quarterly*, 40(2): 5-12. 9 pp.
CS474 Intro to Natural Language Processing: Question Answering, downloaded Dec. 12, 2011 from http://www.cs.cornell.edu/courses/cs474/2005fa/Handouts/advanced-qa.pdf, 8 pgs.
Debrauwer et al., "Semantic Searching and Text Analysis with Distinguo®," downloaded Dec. 12, 2011 from http://www.ultralingua.com/ul/en/dox/Distinguo-White-Paper.pdf, 6 pp.
Hakia—Meaning-based Search Engine for a Better Search, downloaded Aug. 28, 2008 from http://www.techiequest.com/hakia-meaning-based-search-engine-for-a-better-search/, 8 pgs.
Han et al, "A Study on the Conceptual Modeling and Implementation of a Semantic Search System," Mar. 2008, *Korea Intelligent Information Systems Society*, 14(1): 67-84.
Huibers, "Towards an Axiomatic Aboutness Theory for Information Retrieval," 1998, Information Retrieval: Uncertainty and Logics—Advanced Models for the Representation and Retrieval of Information. Kluwer Academic Publishers, 7 pp.
Hussam et al., "Semantic Highlighting on the WWW: Educational Implications," Nov. 1998, *Proceedings of the WebNet 98 World Conference on the WWW, Internet and Intranet*, 6 pp.
Hutchins, "On the problem of 'Aboutness' in Document Analysis," Apr. 1977, *Journal of Informatics*, 1(1): 17-35. 16 pp.
Kang et al., "Document Indexing: A Concept-Based Approach to Term Weight Estimation," 2005, *Information Processing and Management*, 41:1065-1080, 16 pp.
Kapoor et al., "STAR: A System for Tuple and Attribute Ranking of Query Answer" Apr. 15, 2007, *International Conference on Data Engineering 2007*, 2 pp.
Lo et al., "Using Semantic Relations with World Knowledge for Question Answering," 2006, *Proceedings of the 15th Text Retrieval Conference* (*TREC 15*), 6 pp.
Manegold et al., A multi-query optimizer for Monet, Jan. 31, 2000, Information Systems, 18 pp.
Moens et al., "Measuring Aboutness of an Entity in a Text," 2006, *Proceedings of the 1st Workshop on Graph Based Methods for Natural Language Processing*, 4 pp.
Seki, Y., "Answer Extraction System by Question Type from Query Biased Summary for Newspaper Articles," Sep. 2001-Oct. 2002, *Proceedings of the 3rd NTCIR Workshop*, 8 pp.
Sieg et al., "Learning Ontology-based User Profiles: A Semantic Approach to Personalized Web Search," Nov. 2007, *IEEE Intelligent Informatics Bulletin*, 8(1): 7-18, 12pp.
Smeaton et al., "Experiments on Using Semantic Distances between Words in Images Caption Retrieval," Aug. 1996, *Proceedings of the 19th Annual International ACM SIGIR Conference on Research and Development in Information Retrieval*, 8 pp.
Srihari et al., "Information Extraction Supported Question Answering," Oct. 15, 1999, downloaded from http://handle.dtic.mil/100.2/ADA460042, 12 pp.
Taibi, et al., "A Semantic Search Engine for Learning Resources," 2005, *Recent Research Developments in Learning Technologies*, http://www.formatex.org/micte2005/349.pdf, 5 pp.
Vintar et al., "Semantic Relations in Concept-Based Cross-Language Medical Information Retrieval," Sep. 22, 2003, *Proceedings of the ECML / PKDD Workshop on Adaptive Text Extraction and Mining*, 9 pp.
U.S. Official Action dated Jan. 4, 2012 in U.S. Appl. No. 12/201,978.
U.S. Notice of Allowance dated Apr. 5, 2012 in U.S. Appl. No. 12/201,504.
U.S. Notice of Allowance dated May 14, 2012 in U.S. Appl. No. 12/201,721.

* cited by examiner

EFFICIENTLY REPRESENTING WORD SENSE PROBABILITIES

CROSS-REFERENCE TO RELATED APPLICATIONS

This application claims the benefit of U.S. provisional patent application No. 60/969,447, which was filed on Aug. 31, 2007, and entitled "Bucketized Threshold for Runtime Ranking and Pruning of Senses", and U.S. provisional patent application No. 60/969,486, which was filed on Aug. 31, 2007, and entitled "Fact-Based Indexing for Natural Language Search", both of which are expressly incorporated herein by reference in their entirety.

BACKGROUND

Word sense disambiguation ("WSD") can be utilized as a useful stage in an automated process for identifying the meaning of a discourse of text. WSD refers to the process of identifying which sense of a word that has multiple distinct senses is being used in a given passage of text. In the context of a semantically based search engine, WSD may be utilized to determine and index an author's intended sense for an ambiguous word in a passage. This allows the search engine to return the passage, or a document containing the passage, in response to a query that indicates the particular sense, and to not return the passage or document for queries related to other senses.

Due to uncertainty in automatic WSD systems, a particular word in a document might refer to many possible senses with varying levels of probability called word sense probabilities. For example, when used as a noun the word "print" may refer to the text appearing in a book, a picture printed from an engraving, or a copy of a movie on film. There may be a certain probability that the word in context refers to the text appearing in a book, another probability that the word refers to a picture printed from an engraving, and yet another probability that the word refers to a copy of a movie on film.

In order for a semantically based search engine to utilize word sense probabilities at query time, the probabilities need to be stored in a semantic index utilized by the search engine. Because word sense probabilities are typically represented as real numbers, however, storage of word sense probabilities for all of the words identified in a semantic index can consume an enormous amount of data storage capacity.

It is with respect to these considerations and others that the disclosure made herein is presented.

SUMMARY

Technologies are described herein for efficiently representing and storing word sense probabilities in a manner that is suitable for use with a semantic index utilized by a semantically based search engine. Through the use of the concepts and technologies presented herein, the amount of storage space needed to store the word sense probability for a word can be reduced from multiple bytes down to as few as several bits, thereby saving a significant amount of space as compared to previous implementations.

According to one aspect presented herein, word sense probabilities are compressed for storage in a semantic index. In order to compress the word sense probabilities for a word, the word senses associated with the word are first identified. Once the word senses have been identified, a word sense probability is obtained for each of the word senses. As mentioned above, each word sense probability may be expressed utilizing a real number.

In order to efficiently represent the word sense probabilities, each word sense is assigned a score (referred to herein as a "bucket score"). A monotonic relationship exists between the word sense probabilities and the bucket scores. This means that if a word sense probability for a first sense of a word is greater than the word sense probability for a second sense of the word, then the bucket score for the first sense of the word will also be greater than or equal to the bucket score for the second sense of the word.

According to one embodiment, bucket scores are represented utilizing an N bit binary number. For instance, using a 2-bit binary number, four buckets may be created with bucket numbers 11, 10, 01, and 00, respectively. In order to use such a relatively small number of bucket scores to represent word sense probabilities, a scoring function is utilized to assign the bucket scores that maximizes the entropy of the assigned bucket scores.

In one embodiment, the entropy is maximized by associating approximately equal percentages of word sense probabilities to each of the bucket scores. For example, if there were four scores (a 2-bit representation) and twenty total token occurrences, the bucket scores would be chosen such that approximately five token occurrences are assigned to each of the four bucket scores. It should be appreciated that due to ties in bucket scores, it may not be possible to assign exactly the same number of occurrences to each bucket score. In this case, ties may be broken systematically by assigning equal probabilities to equal bucket scores or in an arbitrary manner.

Once the bucket scores have been assigned to the word senses, the bucket scores are stored in the semantic index. According to embodiments, the bucket scores stored in the semantic index may be utilized to prune one or more of the word senses prior to construction of the semantic index. Similarly, the bucket scores may be utilized to rank the word senses at the time a query is performed using the semantic index. Additionally, the bucket scores may be utilized to prune one or more of the word senses at the time a query is performed.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
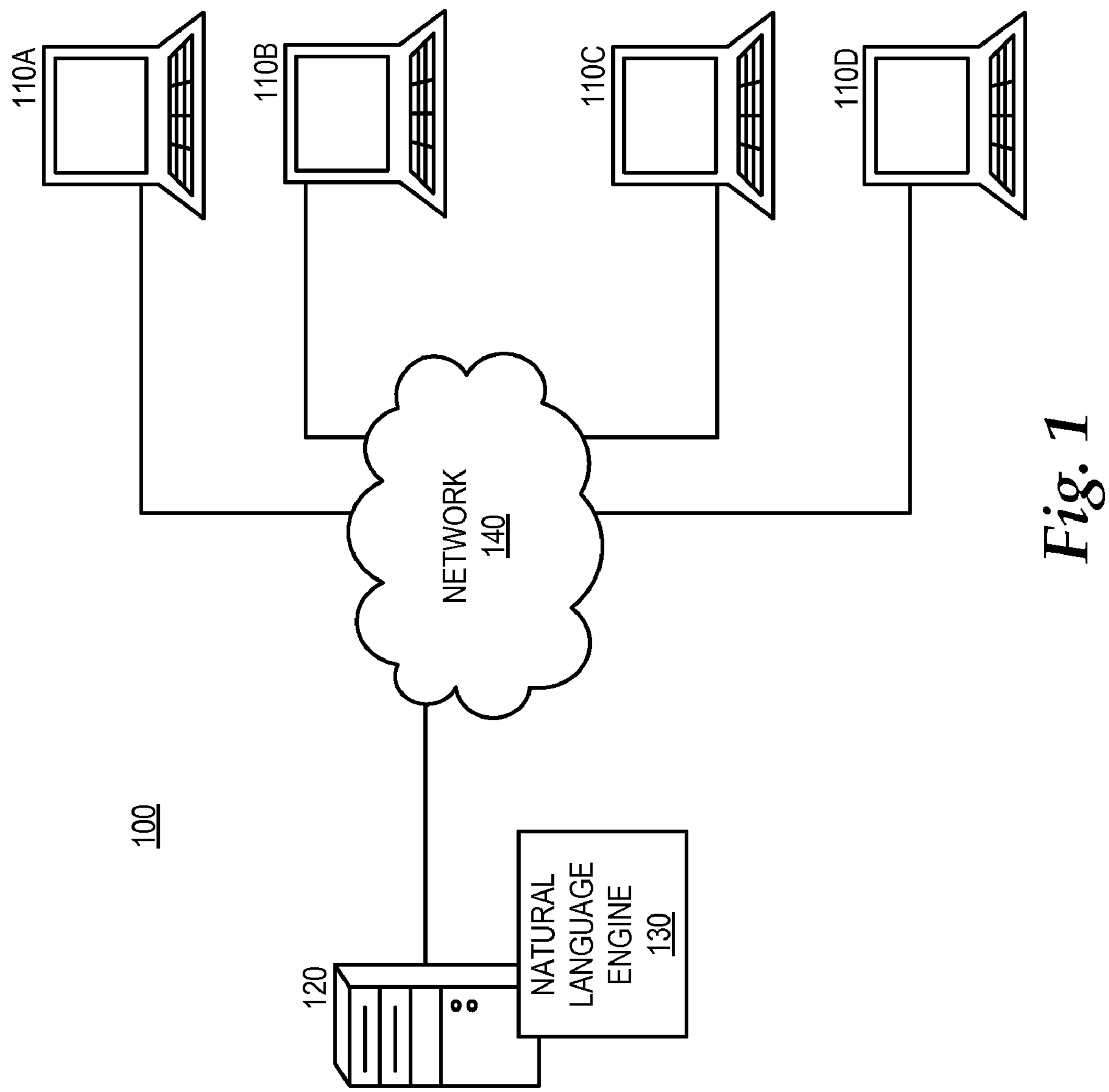
FIG. 1 is a network diagram showing aspects of an illustrative operating environment for the embodiments presented herein.

The following detailed description is directed to technologies for efficiently representing word sense probabilities. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for efficiently representing word sense probabilities will be described.

Turning now to FIG. 1, details will be provided regarding an illustrative operating environment for the implementations presented herein. In particular, a network architecture diagram 100 illustrates an information search system according to aspects of an embodiment presented herein. Client computers 110A-110D can interface through a network 140 to a server 120 to obtain information associated with a natural language engine 130. While four client computers 110A-110D are illustrated, it should be appreciated that any number of client computers 110A-110D may be in use. The client computers 110A-110D may be geographically distributed across a network 140, distributed across a separate network, collocated, or any combination thereof. While a single server 120 is illustrated, it should be appreciated that the functionality of the server 120 may be distributed over any number of multiple servers 120. Such multiple servers 120 may be collocated, geographically distributed across a network 140, or any combination thereof.

According to one or more embodiments, the natural language engine 130 may support search engine functionality. In a search engine scenario, a user query may be issued from a client computer 110A-110D through the network 140 and on to the server 120. The user query may be in a natural language format. At the server, the natural language engine 130 may process the natural language query to support a search based upon syntax and semantics extracted from the natural language query. Results of such a search may be provided from the server 120 through the network 140 back to the client computers 110A-110D.

One or more search indexes may be stored at, or in association with, the server 120. Information in a search index may be populated from a set of source information, or a corpus. For example, in a web search implementation, content may be collected and indexed from various web sites on various web servers (not illustrated) across the network 140. Such collection and indexing may be performed by software executing on the server 120, or on another computer (not illustrated). The collection may be performed by web crawlers or spider applications. The natural language engine 130 may be applied to the collected information such that natural language content collected from the corpus may be indexed based on syntax and semantics extracted by the natural language engine 130. Indexing and searching is discussed in further detail with respect to FIG. 2.

The client computers 110A-110D may act as terminal clients, hypertext browser clients, graphical display clients, or other networked clients to the server 120. For example, a web browser application at the client computers 110A-110D may support interfacing with a web server application at the server 120. Such a browser may use controls, plug-ins, or applets to support interfacing to the server 120. The client computers 110A-110D can also use other customized programs, applications, or modules to interface with the server 120. The client computers 110A-110D can be desktop computers, laptops, handhelds, mobile terminals, mobile telephones, television set-top boxes, kiosks, servers, terminals, thin-clients, or any other computerized devices.

The network 140 may be any communications network capable of supporting communications between the client computers 110A-110D and the server 120. The network 140 may be wired, wireless, optical, radio, packet switched, circuit switched, or any combination thereof. The network 140 may use any topology, and links of the network 140 may support any networking technology, protocol, or bandwidth such as Ethernet, DSL, cable modem, ATM, SONET, MPLS, PSTN, POTS modem, PONS, HFC, satellite, ISDN, WiFi, WiMax, mobile cellular, any combination thereof, or any other data interconnection or networking mechanism. The network 140 may be an intranet, an internet, the Internet, the World Wide Web, a LAN, a WAN, a MAN, or any other network for interconnection computers systems.

It should be appreciated that, in addition to the illustrated network environment, the natural language engine 130 can be operated locally. For example, a server 120 and a client computer 110A-110D may be combined onto a single computing device. Such a combined system can support search indexes stored locally or remotely.

Figure 2:
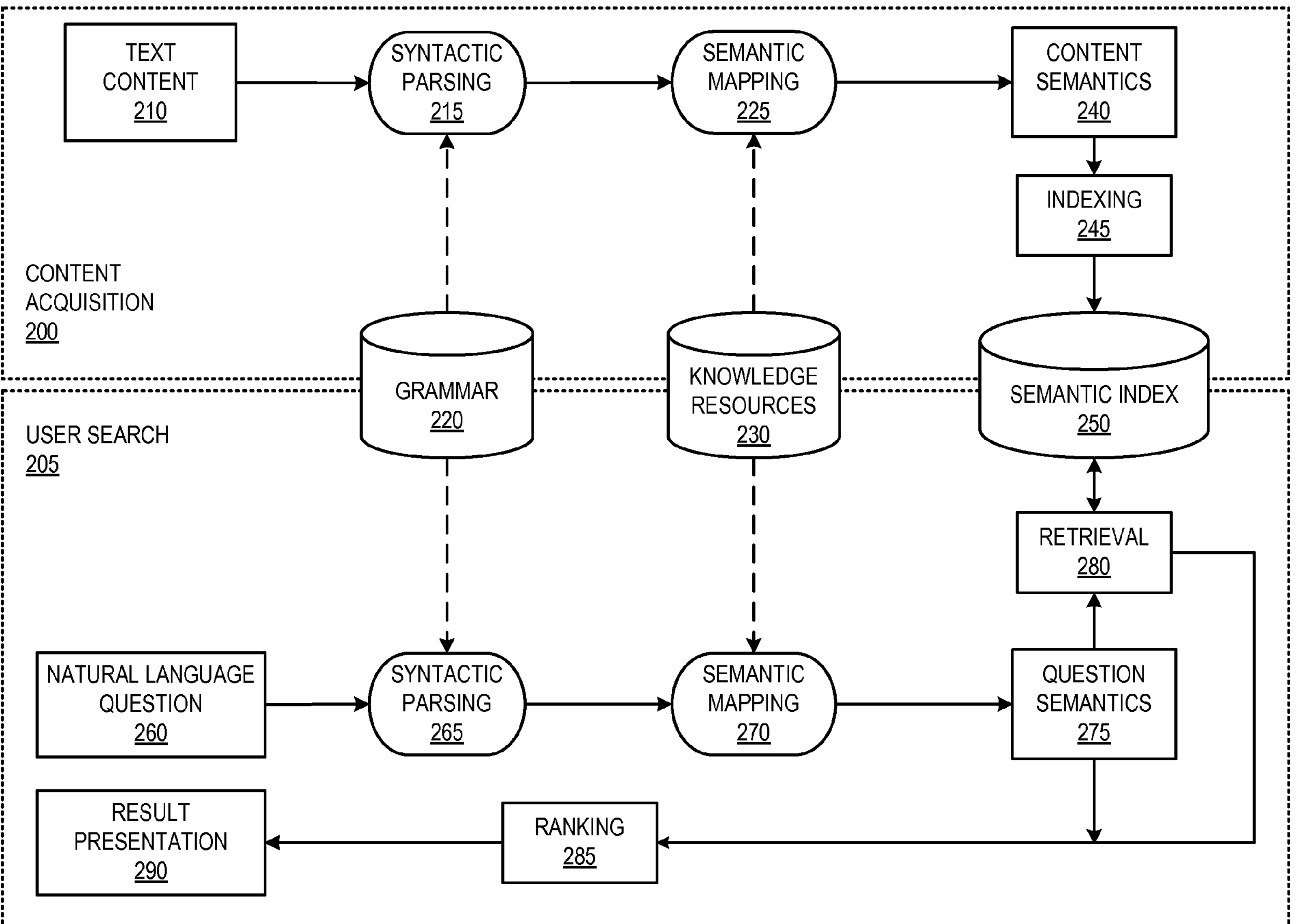
FIG. 2 is a software architecture diagram showing additional aspects of one illustrative operating environment for the embodiments presented herein.

Referring now to FIG. 2, a functional block diagram illustrates various components of a natural language engine 130 according to one exemplary embodiment. As discussed above, the natural language engine 130 can support information searches. In order to support such searches, a content acquisition process 200 is performed. Operations related to content acquisition 200 extract information from documents provided as text content 210. This information can be stored in a semantic index 250 that can be used for searching. Operations related to a user search 205 can support processing of a user entered search query. The user query can take the form of a natural language question 260. The natural language engine 130 can analyze the user input to translate a query into a representation to be compared with information represented within the semantic index 250. The content and structuring of information in the semantic index 250 can support rapid matching and retrieval of documents, or portions of documents, that are relevant to the meaning of the query or natural language question 260.

The text content 210 may comprise documents in a very general sense. Examples of such documents can include web pages, textual documents, scanned documents, databases, information listings, other Internet content, or any other information source. This text content 210 can provide a corpus of information to be searched. Processing the text content 210 can occur in two stages as syntactic parsing 215 and semantic mapping 225. Preliminary language processing steps may occur before, or at the beginning of parsing 215. For example, the text content 210 may be separated at sentence boundaries. Proper nouns may be identified as the names of particular people, places, objects or events. Also, the grammatical properties of meaningful word endings may be determined. For example, in English, a noun ending in "s" is likely to be a plural noun, while a verb ending in "s" may be a third person singular verb.

Parsing 215 may be performed by a syntactic analysis system such as the Xerox Linguistic Environment (XLE). Parsing 215 can convert sentences to representations that make explicit the syntactic relations among words. Parsing 215 can apply a grammar 220 associated with the specific language in use. For example, parsing 215 can apply a grammar 220 for English. The grammar 220 may be formalized, for example, as a lexical functional grammar (LFG). The grammar 220 can specify possible ways for constructing meaningful sentences in a given language. Parsing 215 may apply the rules of the grammar 220 to the strings of the text content 210.

A grammar 220 may be provided for various languages. For example, LFG grammars have been created for English, French, German, Chinese, and Japanese. Other grammars may be provided as well. A grammar 220 may be developed by manual acquisition where grammatical rules are defined by a linguist or dictionary writer. Alternatively, machine learning acquisition can involve the automated observation and analysis of many examples of text from a large corpus to automatically determine grammatical rules. A combination of manual definition and machine learning may be also be used in acquiring the rules of a grammar 220.

Parsing 215 can apply the grammar 220 to the text content 210 to determine constituent structures (c-structures) and functional structures (f-structures). The c-structure can represent a hierarchy of constituent phrases and words. The f-structure can encode roles and relationships between the various constituents of the c-structure. The f-structure can also represent information derived from the forms of the words. For example, the plurality of a noun or the tense of a verb may be specified in the f-structure.

During a semantic mapping process 225 that follows the parsing 215, information can be extracted from the f-structures and combined with information about the meanings of the words in the sentence. A semantic map or semantic representation of a sentence can be provided as content semantics 240. Semantic mapping 225 can augment the syntactic relationships provided by parsing 215 with conceptual properties of individual words. The results can be transformed into representations of the meaning of sentences from the text content 210. Semantic mapping 225 can determine roles played by words in a sentence. For example, the subject performing an action, something used to carry out the action, or something being affected by the action. For the purposes of search indexing, words can be stored in a semantic index 250 along with their roles. Thus, retrieval from the semantic index 250 can depend not merely on a word in isolation, but also on the meaning of the word in the sentences in which it appears within the text content 210. Semantic mapping 225 can support disambiguation of terms, determination of antecedent relationships, and expansion of terms by synonym, hypernym, or hyponym.

Semantic mapping 225 can apply knowledge resources 230 as rules and techniques for extracting semantics from sentences. The knowledge resources can be acquired through both manual definition and machine learning, as discussed with respect to acquisition of grammars 220. The semantic mapping 225 process can provide content semantics 240 in a semantic extensible markup language (semantic XML or semxml) representation. Content semantics 240 can specify roles played by words in the sentences of the text content 210. The content semantics 240 can be provided to an indexing process 245.

An index can support representing a large corpus of information so that the locations of words and phrases can be rapidly identified within the index. A traditional search engine may use keywords as search terms such that the index maps from keywords specified by a user to articles or documents where those keywords appear. The semantic index 250 can represent the semantic meanings of words in addition to the words themselves. Semantic relationships can be assigned to words during both content acquisition 200 and user search 205. Queries against the semantic index 250 can be based on not only words, but words in specific roles. The roles are those played by the word in the sentence or phrase as stored in the semantic index 250. The semantic index 250 can be considered an inverted index that is a rapidly searchable database whose entries are semantic words (i.e. word in a given role) with pointers to the documents, or web pages, on which those words occur. The semantic index 250 can support hybrid indexing. Such hybrid indexing can combine features and functions of both keyword indexing and semantic indexing.

User entry of queries can be supported in the form of natural language questions 260. The query can be analyzed through a natural language pipeline similar, or identical, to that used in content acquisition 200. That is, the natural language question 260 can be processed by parsing 265 to extract syntactic structure. Following syntactic parsing 265, the natural language question 260 can be processed for semantic mapping 270. The semantic mapping 270 can provide question semantics 275 to be used in a retrieval process 280 against the semantic index 250 as discussed above. The retrieval process 280 can support hybrid index queries where both keyword index retrieval and semantic index retrieval may be provided alone or in combination.

In response to a user query, results of the retrieval process 280 from the semantic index 250 along with the question semantics 275 can inform a ranking process 285. Ranking can leverage both keyword and semantic information. During ranking 285, the results obtained by the retrieval process 280 can be ordered by various metrics in an attempt to place the most desirable results closer to the top of the retrieved information to be provided to the user as a result presentation 290.

Figure 3A:
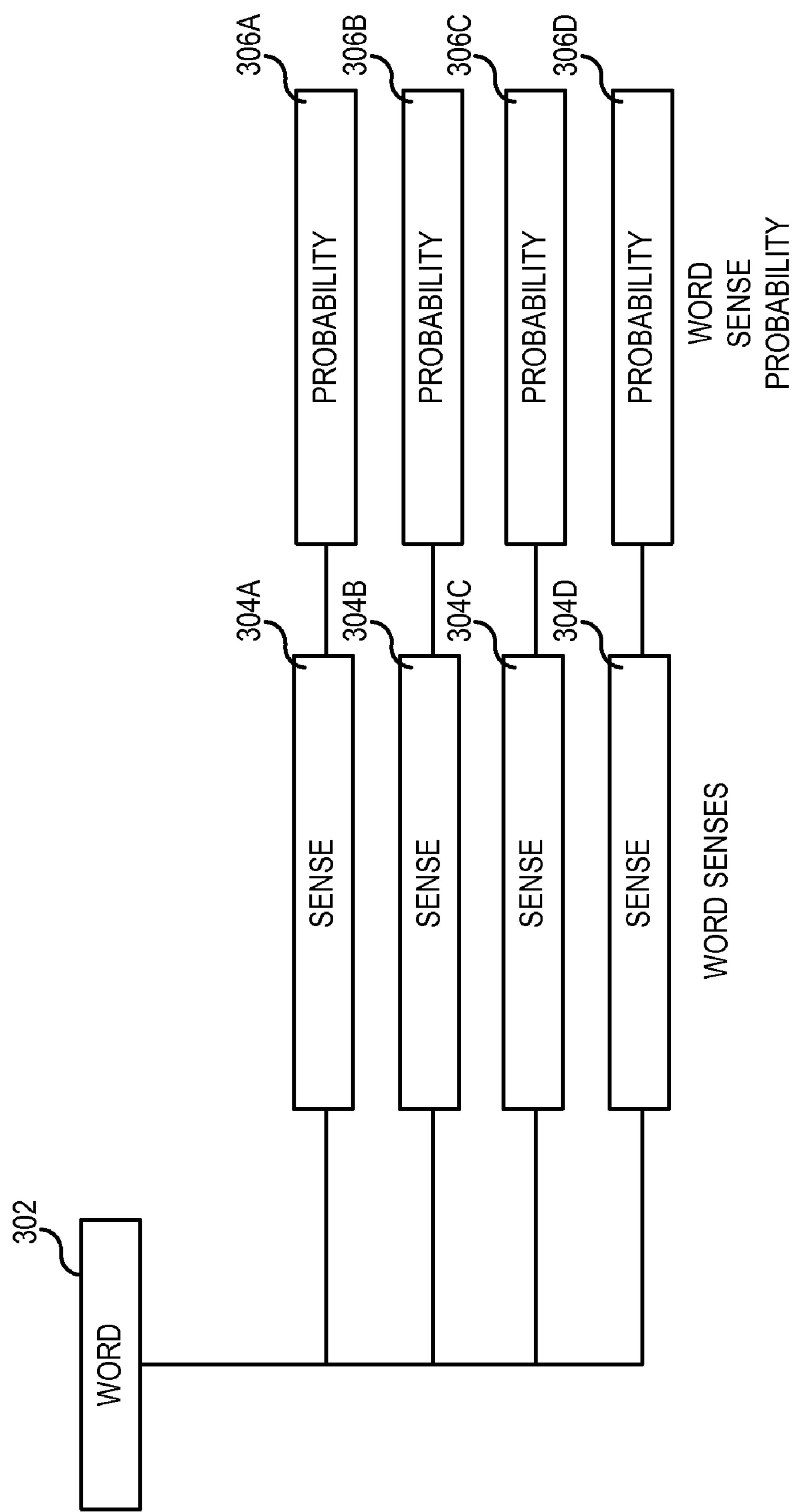
FIGS. 3A-3B are data structure diagrams illustrating several aspects of word senses and word sense probabilities utilized in embodiments presented herein.

Turning now to FIG. 3A, additional details will be provided regarding aspects of the operation of the natural language engine 130 for efficiently representing and storing word sense probabilities in the semantic index 250. As described briefly above, word sense disambiguation may be utilized by the natural language engine 130 to determine and index an author's intended sense for an ambiguous word in a passage. This allows the natural language engine 130 to return the passage, or a document containing the passage, in response to a query that indicates the particular sense, and to not return the passage or document for queries related to other senses.

Due to uncertainty in automatic word sense disambiguation systems, a particular word 302 in a document within the content 210 might refer to many possible senses 304A-304D with varying levels of probability called word sense probabilities 306A-306D. In order for the natural language engine 130 to utilize these word sense probabilities 306A-306D at query time, the probabilities 306A-306D are stored in the semantic index 250.

Figure 3B:
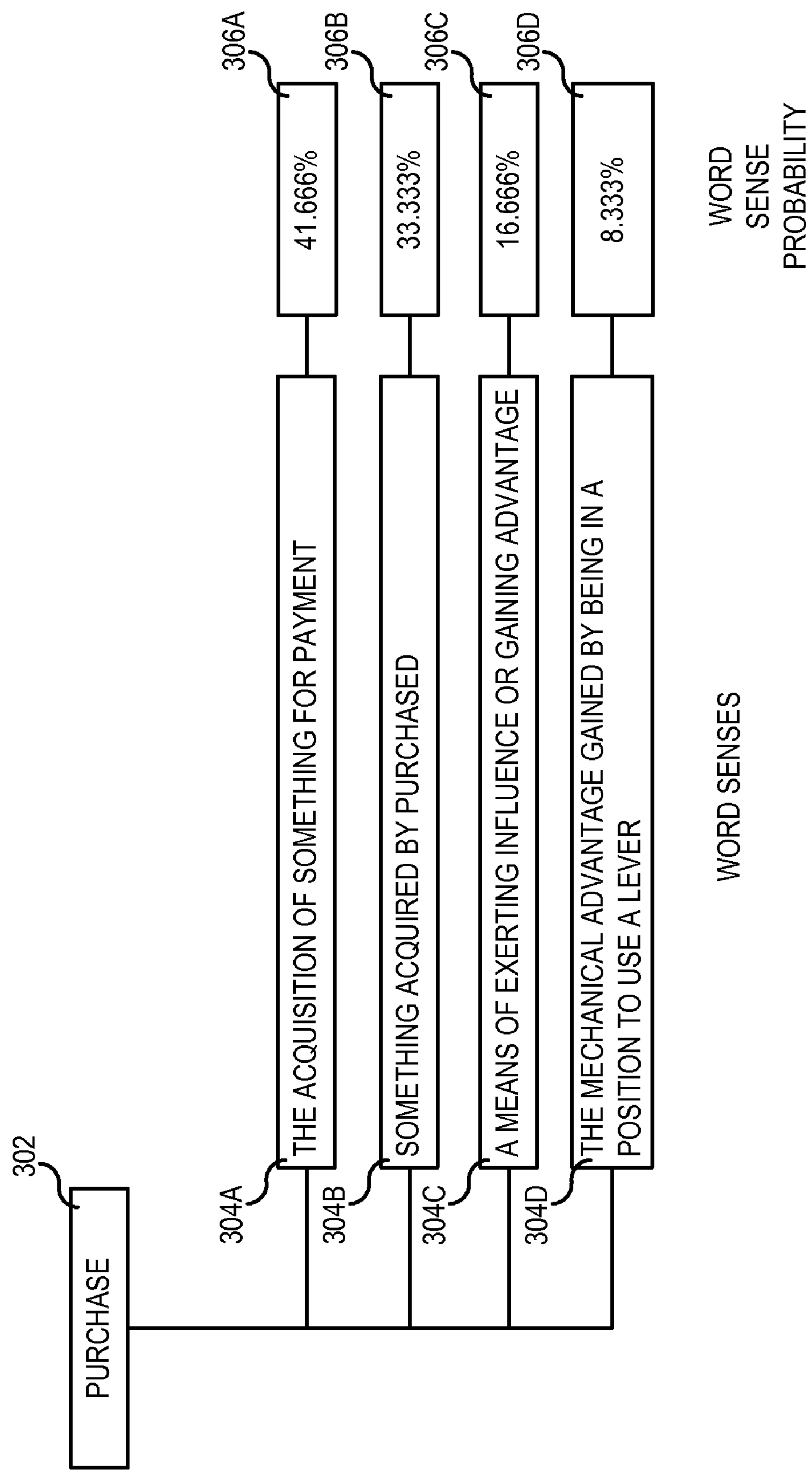

FIG. 3B illustrates several word senses 304A-304B and their associated word sense probabilities 306A-306D for the illustrative word "purchase." As shown in FIG. 3B, one sense 304A of the word "purchase" may refer to the acquisition of something by payment. Another sense 304B may refer to something acquired by purchase. A third sense 304C of the word "purchase" may refer to a means of exerting influence or gaining advantage. A fourth sense 304D of the word "purchase" may refer to the mechanical advantage gained by being in a position to use a lever. It should be appreciated that although four word senses 304A-304D are illustrated in FIGS. 3A-3B, a word 302 may have more or fewer word senses.

As also shown in FIG. 3B, each of the word senses 304A-304B has a word sense probability associated therewith. For instance, the word sense 304A has a word sense probability 306A of 41.666% associated therewith. The word sense 304B has a word sense probability 306B of 33.333%, the word sense 304C has a word sense probability 306C of 16.666%, and the word sense 304D has a word sense probability 306D of 8.333%. Each word sense probability 306 identifies the probability that the associated word 302 refers to a corresponding word sense 304.

Because the word sense probabilities 306A-306D are typically represented as real numbers, however, storage of the word sense probabilities 306A-306D for all of the words identified in the semantic index 250 can consume an enormous amount of data storage capacity. The embodiments presented herein provide concepts and technologies for significantly reducing the amount of storage space needed to store the word sense probabilities 306A-306D. Additional details regarding these technologies are provided below.

Figure 4A:
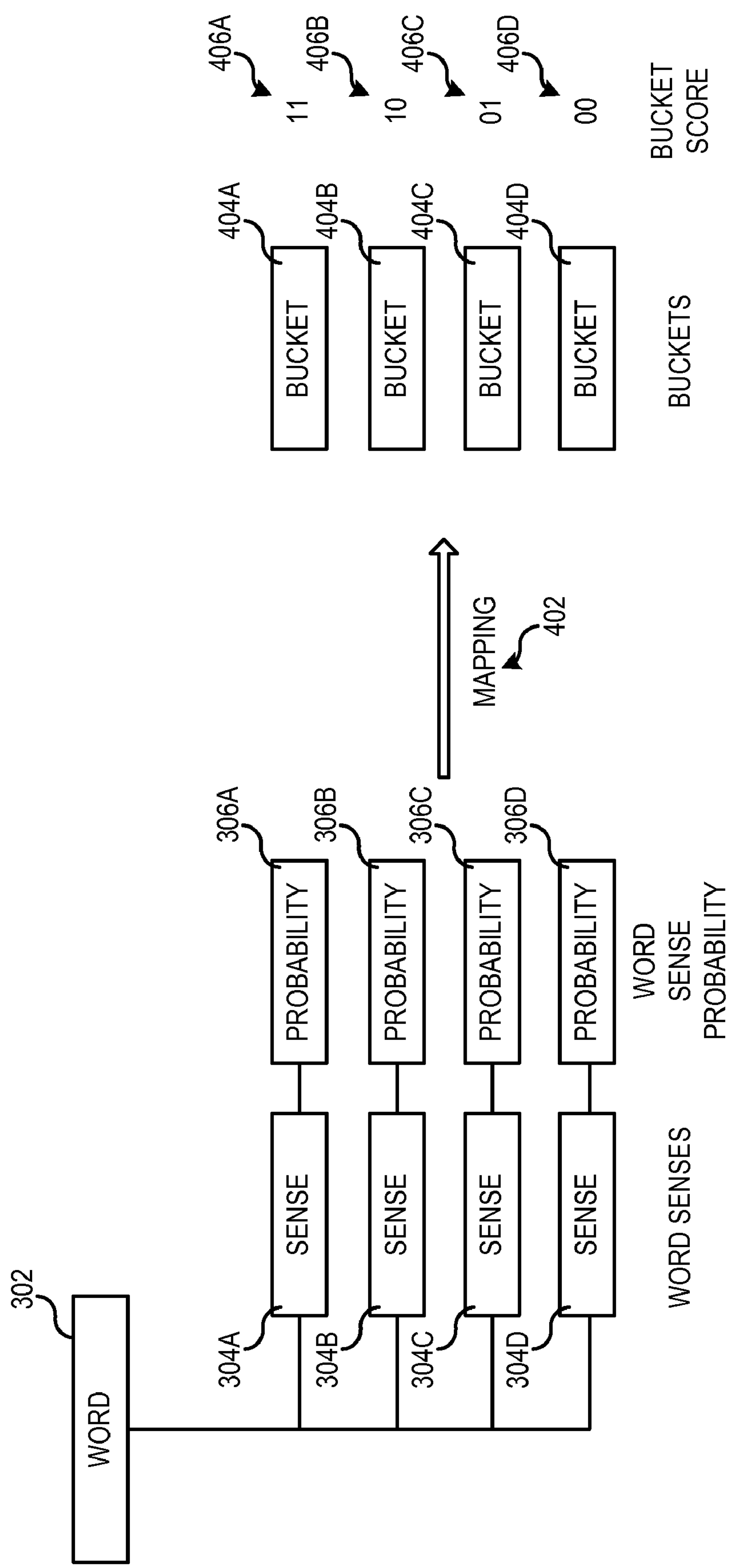
FIGS. 4A-4B are data structure diagrams illustrating aspects of bucket scores utilized in embodiments herein to efficiently represent word sense probabilities.

Turning now to FIG. 4A, details will be provided regarding one embodiment presented herein for more efficiently representing the word sense probabilities 306A-306D. In the example shown in FIG. 4A, the word 302 has four possible word senses 304A-304D and each of the word senses 304A-304D has an associated word sense probability 306A-306D, respectively.

In order to more efficiently represent the word sense probabilities 306A-306D, each word sense 304A-304D is mapped to one of a number of "buckets" 404A-404D. The word senses 304A-304D are mapped to the buckets 404A-404D by assigning a bucket score 406A-406D to each word sense 304. Each bucket score 406A-406D identifies a corresponding bucket 404A-404D, respectively. There is a one-to-one relationship between each bucket 404A-404D and its respective bucket score 406A-406D. In order to retain information regarding the relative magnitudes of the word sense probabilities 306A-306D, a monotonic mapping 402 is enforced between the word sense probabilities 306 and the bucket scores 406A-406D. This means that if the word sense probability 306A for the word sense 304A is greater than the word sense probability 306B for the word sense 304B, then the bucket score 406A for the word sense 304A will also be greater than or equal to the bucket score 406B for the word sense 304B.

According to one embodiment, the bucket scores 406A-406D are represented utilizing an N bit binary number. For instance, using a 2-bit binary number, four buckets 406A-406D may be created with bucket numbers 11, 10, 01, and 00, respectively. In order to use such a relatively small number of buckets 404A-404D to represent all possible word sense probabilities 306A-306D, a scoring function is utilized in one embodiment to assign the bucket scores 406A-406D to the word senses 304A-304D in a manner that maximizes the entropy of the assigned bucket scores 406A-406D. Although a 2-bit implementation is illustrated in FIG. 4A, it should be appreciated that N may comprise any number of bits greater than zero.

Figure 4B:
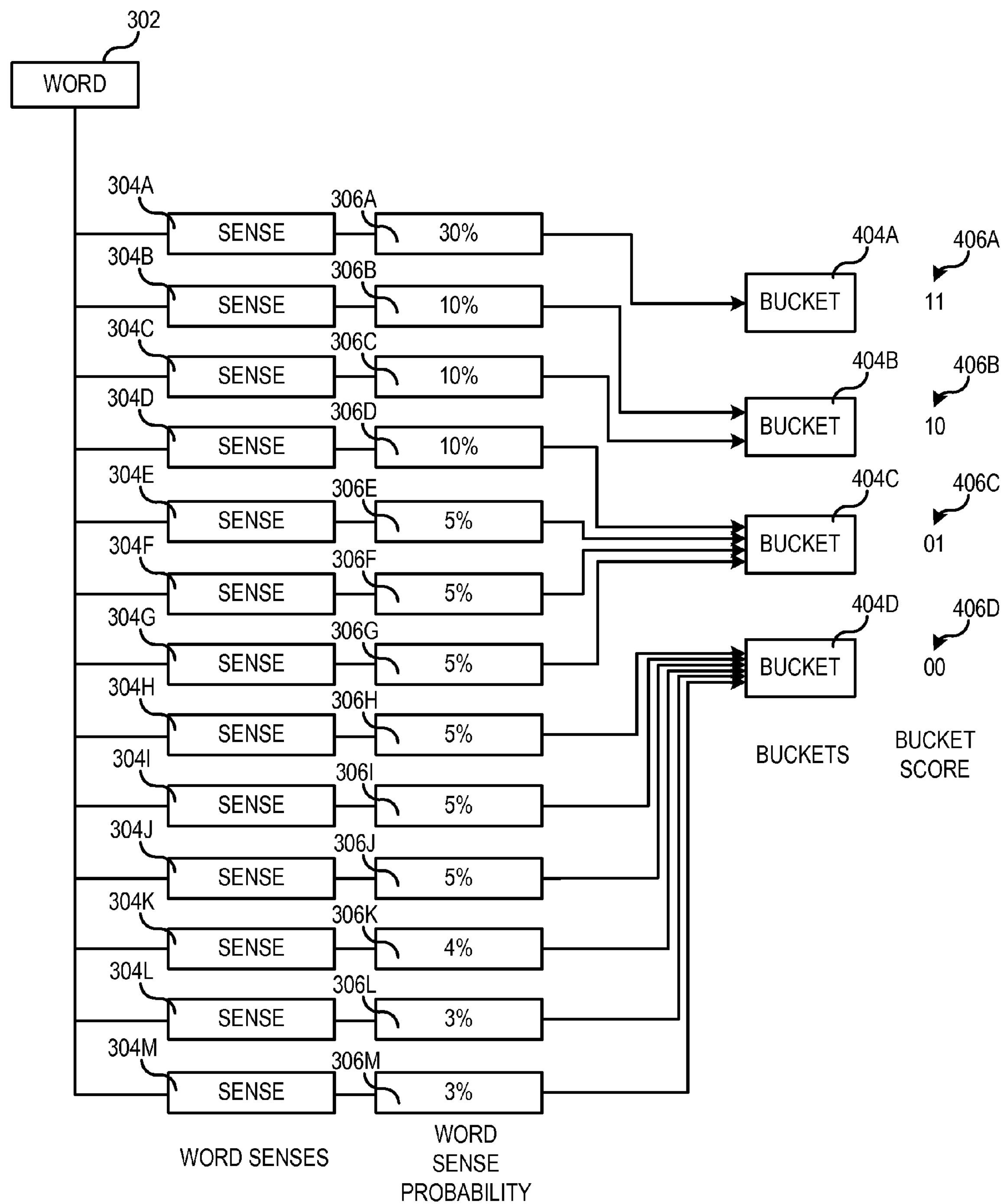

In one embodiment, entropy is maximized by associating approximately equal percentages of the word sense probabilities 306A-306D for all word occurrences 302 to each of the bucket scores 406A-406D. For example, if there were four buckets 404A-404D (a 2-bit representation), the bucket scores would be chosen such that the sum of word sense probabilities in each of the four buckets 404A-404D would be approximately one quarter of the total. For example, in a corpus of 1 million words, each bucket in a 4 bucket implementation would have a sum probability of approximately 250,000. It should be appreciated that due to ties in scores, it may not be possible to assign exactly the same number of occurrences to each of the buckets 404A-404D. In this case, ties may be broken arbitrarily. FIG. 4B illustrates additional details regarding the process of assigning the bucket scores 406A-406D to the word senses 304A-304D.

Referring now to FIG. 4B, additional details will be provided regarding one process presented herein for assigning word senses to bucket scores 406A-406D. In the example shown in FIG. 4B, a word is illustrated that has thirteen word senses 304A-304M. The word sense probabilities 306A-306M have been assigned to each of the word senses 304A-304M. The word sense 304A has a word sense probability 306A of 30%, the word senses 304B-304D have word sense probabilities 306B-306D of 10%, the word senses 304E-304J have word sense probabilities 306E-306J of 5%, the word sense 304K has a word sense probability 306K of 4%, and the word senses 304L-304M have word sense probabilities 306L-306M of 3%, respectively.

The example shown in FIG. 4B illustrates a possible mapping of words senses 304A-304M to bucket scores 406A-406D. In particular, the figure shows the monotonic mapping of many word senses for a single word to a smaller number of bucket scores 406A-406D. In the figure, the word sense 304A (word sense probability 306A of 30%) has been assigned the bucket score 406A. The word senses 306B-306C (total word sense probability of 20%) have been assigned the bucket score 406B. The word senses 306D-306G (total word sense probability of 25%) have been assigned the bucket score 406C. The word senses 306H-306M (total word sense probability of 25%) have been assigned the bucket score 406D.

It should be appreciated that any suitable mechanism may be utilized to allocate approximately equal percentages of word sense probabilities 306 to the bucket scores 406. It should also be appreciated that while ideally an equal percentage of word sense probabilities 306 are assigned to each of the bucket scores 406, this, however, may not be possible. Therefore, approximately equal percentages of the word sense probabilities 306 are assigned to each of the bucket scores 406.

It should also be appreciated that once the bucket scores 406A-406D have been assigned to the word senses 304A-304D, the bucket scores 406A-406D are stored in the semantic index 250. Prior to storing the bucket scores 406A-406D in the semantic index 250, the word sense probabilities 306A-306D or the bucket scores 406A-406D may be utilized to prune out unlikely word senses 304 before the semantic index 250 is built. In this case, pruning refers to the process of eliminating word senses 304 with low probabilities of occurrence from the semantic index 250, thereby reducing the number of word senses that are stored in the semantic index 250.

According to other aspects, the bucket scores 406A-406D stored in the semantic index 250 can also be utilized at query time to prune out unlikely matches. In this case, pruning refers to the process of ignoring word senses 304A-304D that have low bucket scores 406A-406D and that are therefore unlikely to be the intended sense of the word. In a similar fashion, the bucket scores 406A-406D stored in the semantic index 250 can also be used at query time to rank more likely search results above less likely ones. This occurs during the ranking process 285 discussed briefly above with respect to FIG. 2.

Figure 5:
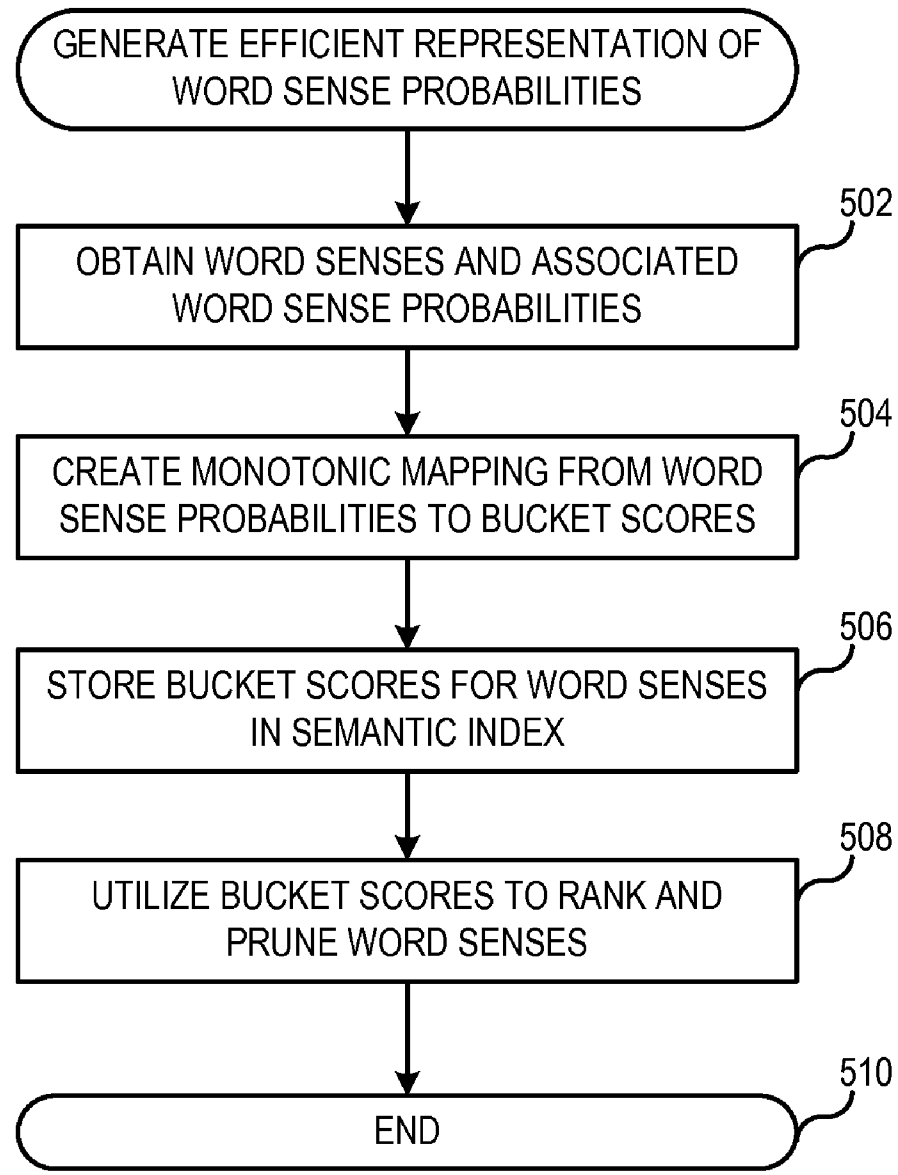
FIG. 5 is a flow diagram showing one illustrative routine for generating efficient representations of word sense probabilities in an embodiment presented herein.

Referring now to FIG. 5, additional details will be provided regarding the embodiments presented herein for efficiently representing word sense probabilities. In particular, FIG. 5 is a flow diagram illustrating aspects of the operation of the natural language engine 130 for efficiently representing, storing, and utilizing the word sense probabilities 306A-306D in conjunction with the creation and use of the semantic index 250.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the word senses 304 and the word sense probabilities 306 are obtained. For instance, in one implementation, the knowledge resources 230 shown in FIG. 2 may include the word senses 304 and word sense probabilities 306. Once the word senses 304 and the word sense probabilities 306 have been obtained, the routine 500 proceeds from operation 502 to operation 504.

At operation 504, a monotonic mapping is created in the manner described above between the word sense probabilities 306 and the bucket scores 406. In this manner, the bucket scores 306 are assigned to each of the word senses 304. The routine 500 then proceeds to operation 506, where the bucket scores 406 are stored in the semantic index 250. As discussed briefly above, the bucket scores 406 may be utilized to prune word senses prior to inclusion in the semantic index 250.

From operation 506, the routine 500 proceeds to operation 508. At operation 508, the bucket scores 406 stored in the semantic index 250 may be utilized to prune the word senses 304 at the time a query is received in the manner described above. Additionally, as also described above the bucket scores 406 may be utilized by the ranking process 285 to rank the results of a query. From operation 508, the routine 500 proceeds to operation 510, where it ends.

Figure 6:
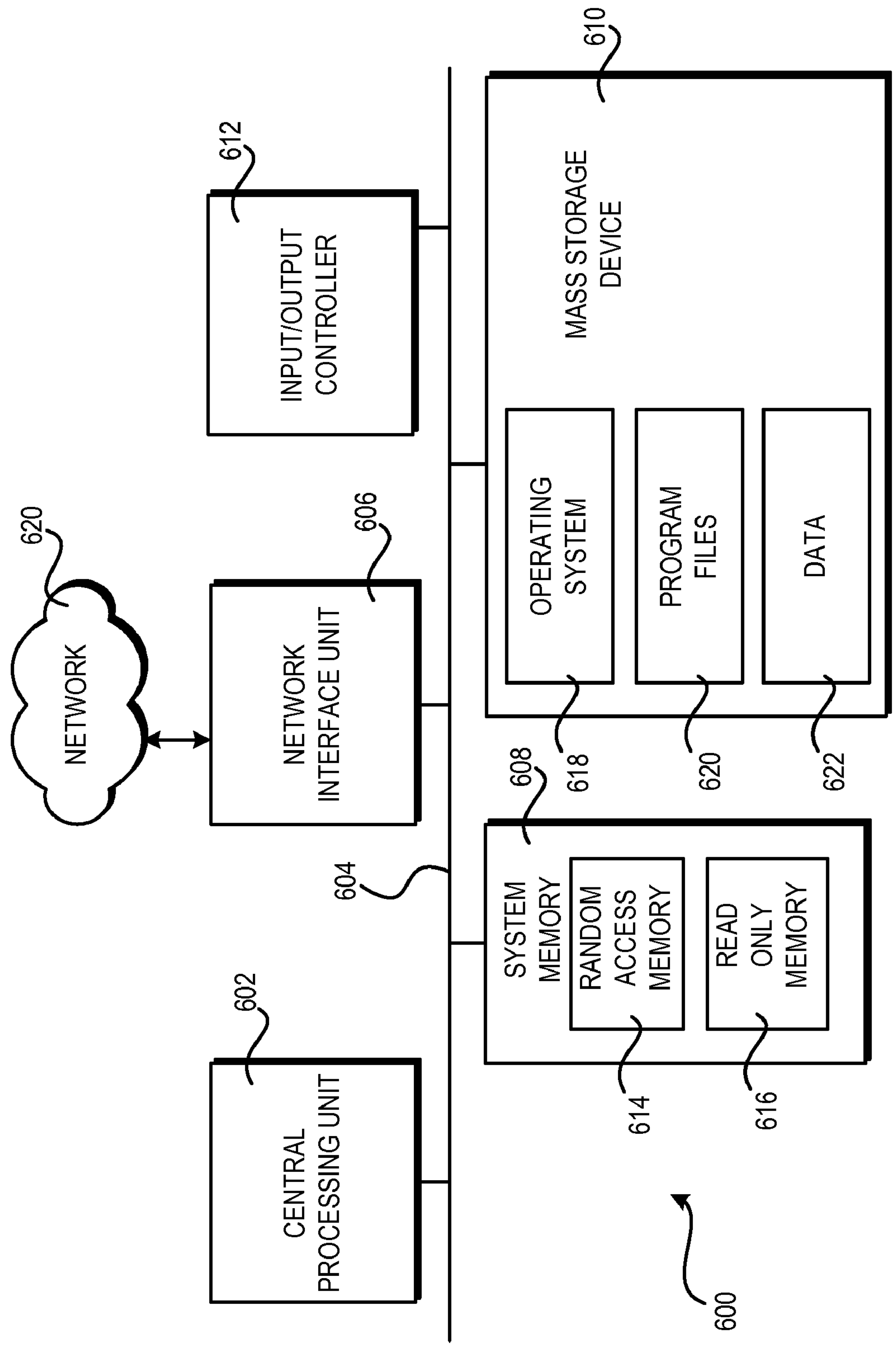
FIG. 6 is a computer architecture diagram showing an illustrative computer hardware and software architecture for a computing system capable of implementing aspects of the embodiments presented herein.

FIG. 6 shows an illustrative computer architecture for a computer 600 capable of executing the software components described herein for efficiently representing word sense probabilities in the manner presented above. The computer architecture shown in FIG. 6 illustrates a conventional desktop, laptop, or server computer and may be utilized to execute any aspects of the software components presented herein.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules 620 and data 622, such as those program modules presented herein and described above with respect to FIGS. 1-5. The mass storage device 610 and the RAM 614 may also store other types of program modules and data.

Based on the foregoing, it should be appreciated that technologies for efficiently representing word sense probabilities are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for efficiently representing word sense probabilities, the method comprising performing computer-implemented operations for:

identifying by way of a computer one or more word senses associated with a word;

obtaining by way of the computer a word sense probability associated with each of the word senses;

mapping each word sense to exactly one of a plurality of N-bit binary numbers by generating a monotonic mapping between the word sense probabilities and the N-bit binary numbers by way of the computer, the N-bit binary numbers mapped to each word sense based upon the word sense probability and whereby approximately equal percentages of the word sense probabilities are associated with each N-bit binary number; and storing the N-bit binary number mapped to each word sense in a semantic index by way of the computer.

2. The method of claim 1, further comprising utilizing the N-bit binary numbers stored in the semantic index to prune one or more of the word senses prior to construction of the semantic index.

3. The method of claim 1, further comprising utilizing the N-bit binary numbers stored in the semantic index to rank the word senses when a query is performed.

4. The method of claim 1, further comprising utilizing the N-bit binary numbers stored in the semantic index to prune one or more of the word senses when a query is performed.

5. A computer storage medium that is not a signal having computer executable instructions stored thereon which, when executed by a computer, cause the computer to:

store a semantic index;

identify one or more word senses associated with a word;

obtain a word sense probability for each of the word senses;

map each word sense to exactly one of a plurality of N-bit binary numbers by assigning an N-bit binary number to the word sense based upon the word sense probability such that a monotonic mapping exists between the word sense probabilities and the N-bit binary numbers, whereby approximately equal percentages of the word sense probabilities are associated with each of the plurality of N-bit numbers; and to store the N-bit binary number assigned to each word sense probability in the semantic index.

6. The computer storage medium of claim 5, wherein each word sense probability identifies a probability that an associated word refers to a corresponding word sense.

7. The computer storage medium of claim 6, comprising further computer executable instructions which, when executed by the computer, will cause the computer to utilize the N-bit binary numbers stored in the semantic index to prune one or more of the word senses prior to construction of the semantic index.

8. The computer storage medium of claim 7, comprising further computer executable instructions which, when executed by the computer, will cause the computer to utilize the N-bit binary numbers stored in the semantic index to rank the word senses when a query is performed.

9. The computer storage medium of claim 8, comprising further computer executable instructions which, when executed by the computer, will cause the computer to utilize the N-bit binary numbers stored in the semantic index to prune one or more of the word senses at the time a query is performed.

10. A computing system for efficiently representing word sense probabilities, the computing system comprising:

a central processing unit;

a memory; and a mass storage device coupled to the central processing unit storing a semantic index and program code that is executable by the central processing unit and which, when executed by the central processing unit, will cause the computing system to identify one or more word senses associated with a word, to obtain a word sense probability for each of the word senses, to create a mapping between each word sense and one of a plurality of N-bit binary numbers by assigning exactly one of the plurality of N-bit binary numbers to each word sense such that word senses having greater word sense probabilities are assigned greater N-bit binary numbers than word senses having lesser word sense probabilities and such that approximately equal percentages of the word sense probabilities are associated with each of the plurality of N-bit binary numbers, to store the N-bit binary number assigned to each word sense probability in the semantic index, and to utilize the N-bit binary numbers stored in the semantic index to prune one or more of the word senses prior to construction of the semantic index, to prune one or more of the word senses at the time a query is performed, or to rank the word senses when a query is performed.

* * * * *